(12) United States Patent
Chiang

(10) Patent No.: US 9,268,111 B2
(45) Date of Patent: Feb. 23, 2016

(54) LENS STRUCTURE

(75) Inventor: Cheng-Nan Chiang, Taipei (TW)

(73) Assignee: ABILITY ENTERPRISE CO., LTD., Taipei (TW)

( * ) Notice: Subject to any disclaimer, the term of this patent is extended or adjusted under 35 U.S.C. 154(b) by 0 days.

(21) Appl. No.: 13/593,202

(22) Filed: Aug. 23, 2012

(65) Prior Publication Data
US 2013/0083406 A1    Apr. 4, 2013

(30) Foreign Application Priority Data

Sep. 30, 2011   (TW) .............................. 100135637 A

(51) Int. Cl.
*G02B 15/14*   (2006.01)
*G02B 7/10*    (2006.01)

(52) U.S. Cl.
CPC ..................................... *G02B 7/102* (2013.01)

(58) Field of Classification Search
USPC ................................................ 359/694–700
See application file for complete search history.

(56) References Cited

U.S. PATENT DOCUMENTS

| | | | |
|---|---|---|---|
| 6,954,314 B2 | 10/2005 | Nomura et al. | |
| 7,039,308 B2 | 5/2006 | Nomura | |
| 7,062,163 B2 | 6/2006 | Nomura | |
| 7,085,487 B2 | 8/2006 | Nomura | |
| 7,212,352 B2 | 5/2007 | Nomura | |
| 7,408,722 B2* | 8/2008 | Ishizuka et al. | 359/701 |
| 2001/0017738 A1* | 8/2001 | Nomura et al. | 359/700 |
| 2003/0035224 A1* | 2/2003 | Nishimura et al. | 359/699 |
| 2007/0009246 A1 | 1/2007 | Lee | |
| 2012/0327519 A1* | 12/2012 | Kang et al. | 359/695 |

FOREIGN PATENT DOCUMENTS

| | | |
|---|---|---|
| TV | 200619718 A | 6/2006 |
| TW | I234672 B | 6/2005 |
| TW | 200624903 A | 7/2006 |
| TW | 200624904 A | 7/2006 |
| TW | I269903 B | 1/2007 |
| TW | I269904 B | 1/2007 |
| TW | I269905 B | 1/2007 |
| TW | 200942958 A | 10/2009 |
| TW | I328695 B | 8/2010 |

* cited by examiner

*Primary Examiner* — James Jones
(74) *Attorney, Agent, or Firm* — Rabin & Berdo, P.C.

(57) ABSTRACT

A lens structure is provided. The lens structure comprises a first barrel, a second barrel and a third barrel. The first barrel has a first groove and comprises a first pin. The second barrel has a second groove and comprises a second pin. The third barrel has a third groove. The first barrel is rotatably disposed outside of the third barrel. The second barrel is disposed in the inside of the third barrel. The second pin of the second barrel slides along the third groove of the third barrel and the first groove of the first barrel. The first pin of the first barrel slides along the second groove of the second barrel.

19 Claims, 10 Drawing Sheets

LENS STRUCTURE

This application claims the benefit of Taiwan application Serial No. 100135637, filed Sep. 30, 2011, the subject matter of which is incorporated herein by reference.

BACKGROUND OF THE INVENTION

1. Field of the Invention

The invention relates in general to a lens structure, and more particularly to a lens structure with multiple barrels.

2. Description of the Related Art

Along with the advance in technology, digital camera mechanism has been widely used in various digital products such as digital camera, digital video recorder, mobile phone, personal digital assistant (PDA). The digital camera mechanism comprises a lens structure and an image sensor. The lens structure focuses an image on the image sensor, which then converts an optical image signal into an electrical signal.

Conventional lens structure comprises a number of barrels which move relatively to each other. A straight forward barrel of the barrels has a groove, which defines an optical zooming path. Through the groove, the straight forward barrel may move in a straight line to zoom in and/or zoom out.

Since the optical zooming path is defined by the groove of only one straight forward barrel, the length of the optical zooming path is limited. However, to increase the length of the optical zooming path, the thickness of the straight forward barrel needs to be increased, and the increase in thickness will increase the volume of the digital camera mechanism and reduce product competitiveness.

SUMMARY OF THE INVENTION

The invention is directed to a lens structure. In an embodiment, the length of the optical zooming path is increased without increasing the thickness of the barrel.

According to an embodiment of the present invention, a lens structure is provided. The lens structure comprises a first barrel, a second barrel and a third barrel. The first barrel comprises a first groove and a first pin. The second barrel comprises a second groove and a second pin. The third barrel comprises a third groove. The first barrel is disposed outside of the third barrel, and the second barrel is disposed inside of the third barrel. Between a telephoto end and a wide-angle end, the second pin of the second barrel slides along the third groove of the third barrel and the first groove of the first barrel, and/or the first pin of the first barrel slides along the second groove of the second barrel.

According to an embodiment of the present invention, a lens structure is provided. The lens structure comprises a first barrel and a second barrel. The first barrel comprises a first groove, and the second barrel comprises a second groove. The first groove and the second groove define an optical zooming path from a telephoto end to a wide-angle end.

According to an embodiment of the present invention, a lens structure is provided. The lens structure comprising a first barrel, a second barrel and a third barrel. The first barrel comprises a first groove and a first pin, and the second barrel comprises a second groove and a second pin. The first barrel is rotatably disposed outside of the third barrel, the second barrel is disposed inside of the third barrel, and the first groove and the second groove together define an optical zooming path. During a zooming process, the second pin sliding along the first groove, and/or the first pin sliding along the second groove.

According to an embodiment of the present invention, a lens structure is provided. An electronic apparatus comprising the lens structure claimed in above lens structure.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
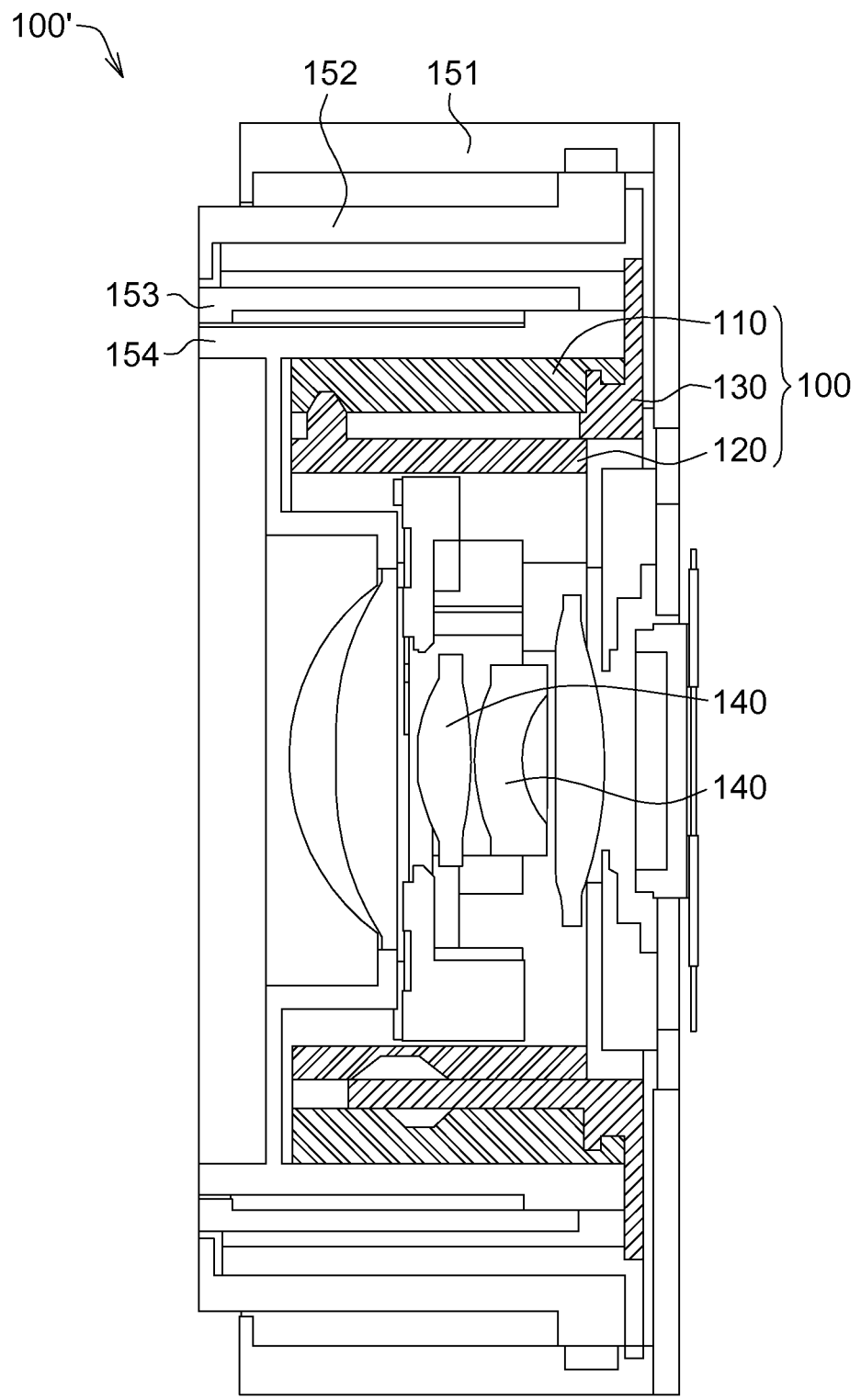
FIG. 1 shows a cross-sectional view of an image capturing device according to an embodiment of the invention.

Referring to FIG. 1, a cross-sectional view of an image capturing device according to an embodiment of the invention is shown. The image capturing device 100' is an electronic apparatus with image capturing function, and may be realized by such as digital camera, digital video recorder, mobile phone or personal digital assistant (PDA). The image capturing device 100' comprises a lens structure 100 and at least one lens 140. The lens 140 may be realized by a concave lens or a convex lens.

As indicated in FIG. 1, the lens structure 100 comprises a first barrel 110, a second barrel 120 and a third barrel 130. The lens 140 is disposed inside of the second barrel 120. By rotating the first barrel 110, the second barrel 120 is driven to change the position of the lens 140, which is switched between a close end, a wide angle position and a telephoto end. The first barrel 110 may rotate around the Z-axis such as the direction of the optical axis.

Besides, the lens structure 100 may additionally comprise barrels 151, 152, 153 and 154, which may perform straight forwarding movement and/or rotation movement. Or, the barrel 151 is fixed on the casing or becomes a part of the casing. Each of two connected barrels has a groove and/or a pin. Through the relative movement between the groove and the pin, the two connected barrel performs predetermined rotation movement and/or straight forwarding movement. In an embodiment, degree of freedom (DOF) in movement for the lens structure 100 is 1. The movement of the barrels 151~154 depends on the design of the lens structure 100, and the invention is not limited thereto. In addition, the barrels 151~154 may be linked or fixed to at least one of the first barrel 110, the second barrel 120 and the third barrel 130.

Figure 2:
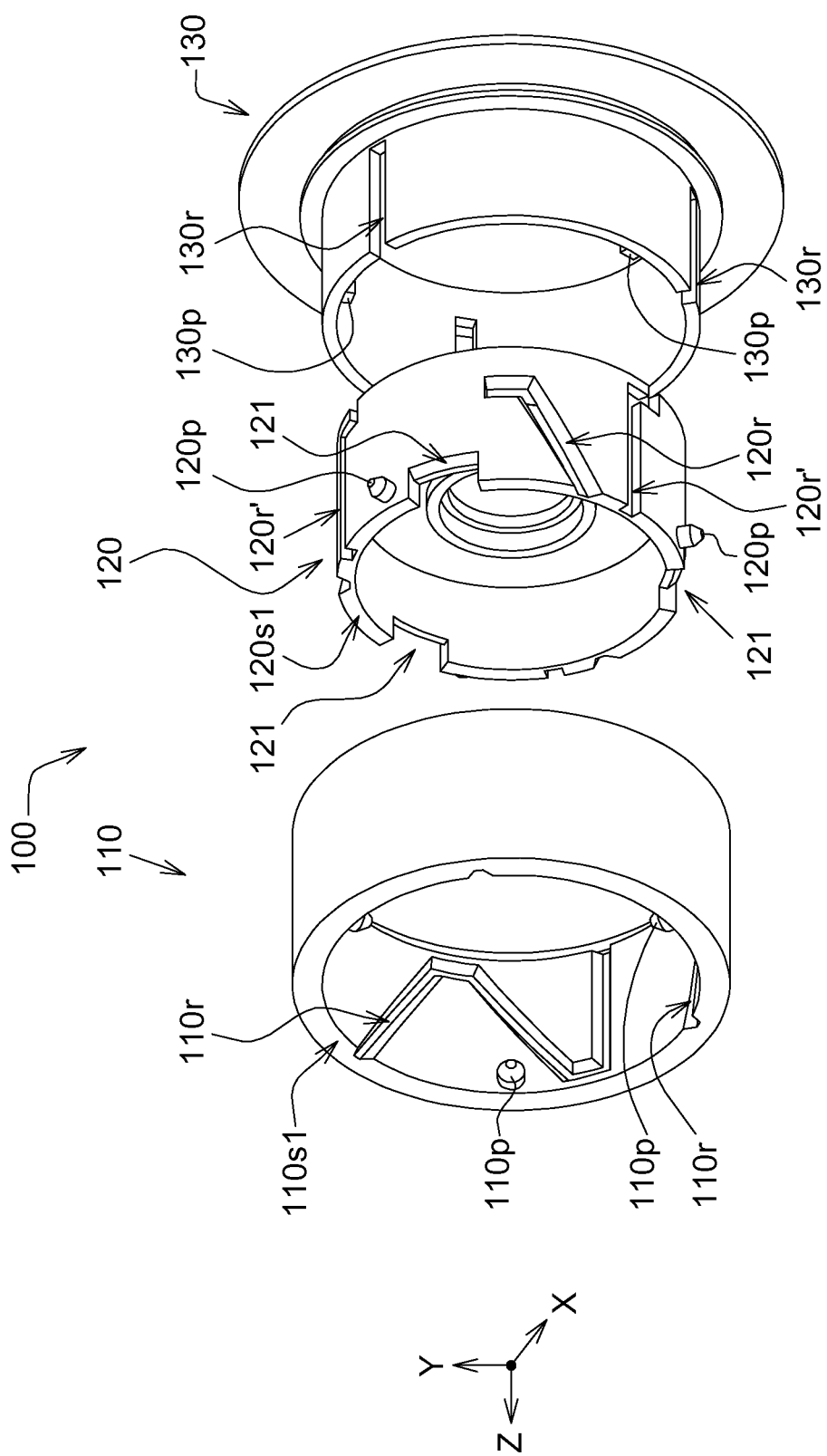
FIG. 2 shows a de-composition diagram of a lens structure according to an embodiment of the invention.

Referring to FIG. 2, a de-composition diagram of a lens structure according to an embodiment of the invention is shown. The first barrel 110 has at least one first groove 110r and comprises at least one first pin 110p. The second barrel 120 has at least one second groove 120r and comprises at least one second pin 120p. The third barrel 130 has at least one third groove 130r. Besides, the third barrel 130 may be fixed on the casing (not illustrated) of an optical image capturing lens device.

Figure 4:
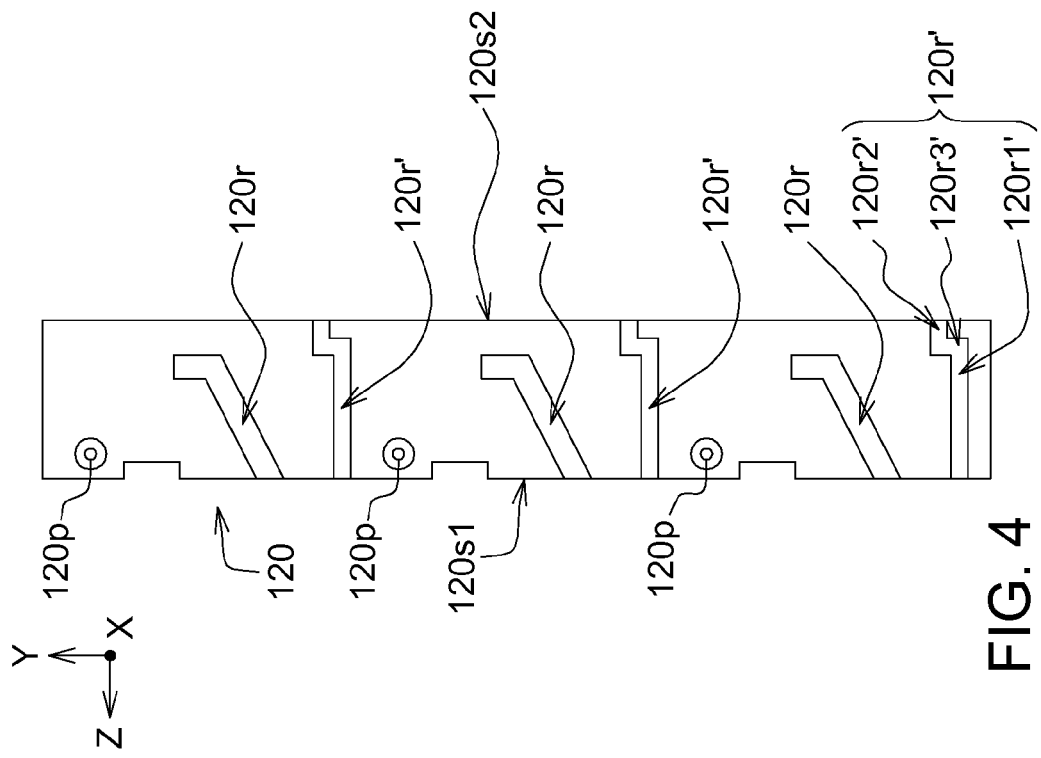
FIG. 4 shows an expansion diagram of a second barrel of FIG. 2.
Figure 3:
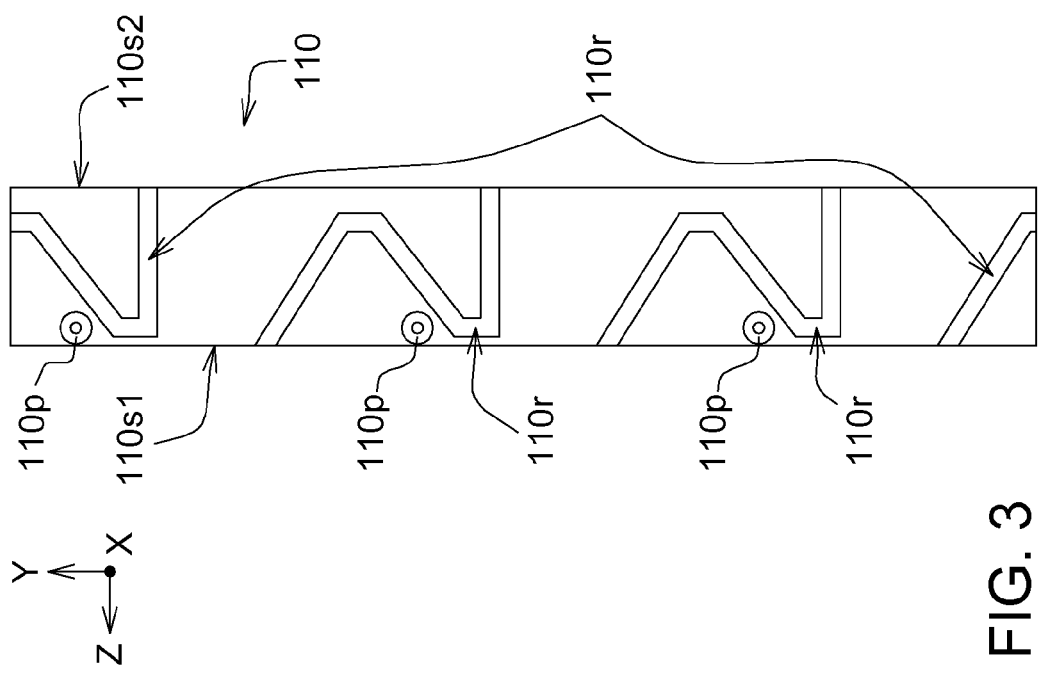
FIG. 3 shows an expansion diagram of a first barrel of FIG. 2.

Referring to FIGS. 3 and 4. FIG. 3 shows an expansion diagram of a first barrel of FIG. 2. FIG. 4 shows an expansion diagram of a second barrel of FIG. 2. The numbers of the first groove 110r, the second pin 120p and the third groove 130r (not illustrated in FIGS. 3 and 4) are corresponding to each other, and are such as three or any other numbers. In addition, the number of the first pin 110p corresponds to that of the second groove 120r, and is such as three or any other numbers.

In the present embodiment, the first groove 110r of the first barrel 110 and the second groove 120r of the second barrel 120 define a continuous optical zooming path from a telephoto end to a wide-angle end. To put it in greater details, the first groove 110r and the second groove 120r are two independent curve-shaped grooves. During the zooming process of the lens structure 100 between a telephoto end and a wide-angle end, the first barrel 110 and the second barrel 120 rotate with respect to each other and/or move forward. When the first barrel 110 and the second barrel 120 are at a predetermined angle and position, the first groove 110r and the second groove 120r are connected as a continuous curve-shaped groove to form an optical zooming path.

Figure 5:
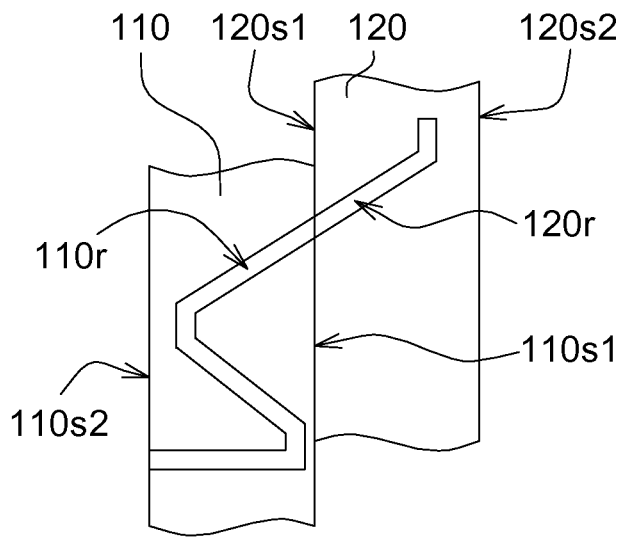
FIG. 5 shows a schematic diagram of an optical zooming path defined by a first groove of FIG. 3 and a second groove of FIG. 4.

Referring to FIG. 5, a schematic diagram of an optical zooming path defined by a first groove of FIG. 3 and a second groove of FIG. 4 is shown. When the first surface 110s1 of the first barrel 110 is connected to the first surface 120s1 of the second barrel 120, the first groove 110r is connected to the second groove 120r so as to define an optical zooming path. Preferably but not restrictively, the first groove 110r and the second groove 120r are smoothly connected. That is, the junction between the first groove 110r and the second groove 120r is not a sharp bending, but the invention is limited thereto.

Since the continuous optical zooming path may be defined by the grooves of different barrels, the length of the continuous optical zooming path is increased. Furthermore, the continuous optical zooming path may be defined by the grooves of different barrels. Under the circumstance that the length of the optical zooming path remains the same or is increased, the thicknesses of the first barrel 110, the second barrel 120 and the third barrel 130 may be reduced, such that both the volume and the weight of the lens structure 100 are reduced accordingly.

Figure 6A:
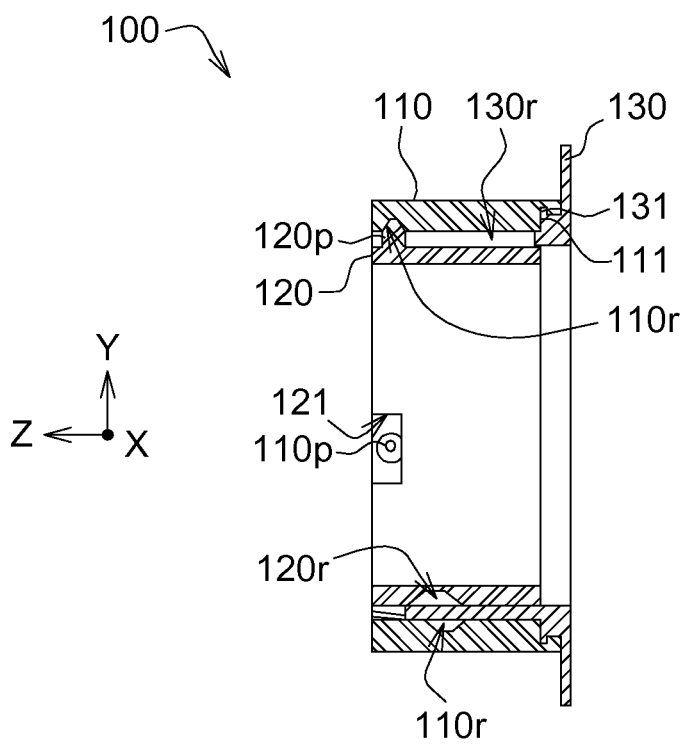
FIG. 6A a cross-sectional view of the lens structure of shows FIG. 2 assembled in a close end.

Referring to FIG. 6A, a cross-sectional view of the lens structure of shows FIG. 2 assembled in a close end is shown. The first barrel 110 is disposed outside of the third barrel 130. Through the design of the second barrel 120 being disposed inside of the third barrel 130, the second pin 120p of the second barrel 120 slides along the first groove 110r of the first barrel 110 and/or the third groove 130r of the third barrel 130, and/or the first pin 110p slides along the second groove 120r (FIG. 8C).

As indicated in FIG. 6A, the first barrel 110 comprises a rotation portion 111, the third barrel 130 comprises a the rotation portion 131, and the rotation portion 111 is rotatably connected to the rotation portion 131, such that the first barrel 110 and the third barrel 130 rotate with respect to each other around the Z-axis. In the present embodiment, the rotation portion 111 is such as a sliding groove, and the rotation portion 131 is such as a sliding rail. In another embodiment, the rotation portion 111 is such as a sliding rail, and the rotation portion 131 is such as a sliding groove. With the rotation portion 111 is engaged with the rotation portion 131, the first barrel 110 and the third barrel 130 cannot shift relatively along the Z-axis. In addition, the second pin 120p of the second barrel 120 slides along the third groove 130r of the third barrel 130 and the first groove 110r of the first barrel 110, so that the second barrel 120 moves forward along the Z-axis when the first barrel 110 rotates around the Z-axis.

As indicated in FIG. 6A, the second barrel 120 has at least one gap 121. When the lens structure is at a close end, the first pin 110p of the first barrel 110 is positioned inside the gap 121. Through the design of the gap 121, the second barrel 120 will not interfere with the first pin 110p. In another embodiment, the gap 121 may be omitted. For example, the first barrel 110 and the second barrel 120 are separated by an interval in which the first pin 110p is positioned. Therefore, even when the gap 121 is omitted, the second barrel 120 will not interfere with the first pin 110p either. Besides, the number of the gap 121 corresponds to that of the first pin 110p, and is such as three or any other numbers.

Figure 6B:
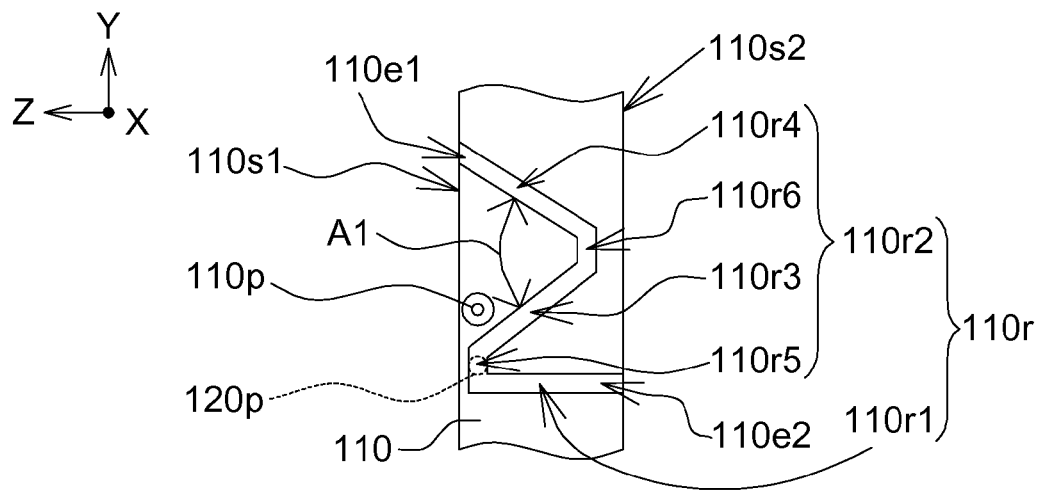
FIG. 6B shows a schematic diagram of a second pin of FIG. 6A positioned at a first groove of FIG. 3.

Referring to FIG. 6B, a schematic diagram of a second pin of FIG. 6A positioned at a first groove of FIG. 3 is shown. The first barrel 110 has a first surface 110s1 and a second surface 110s2 opposite to each other. The first groove 110r extends to the second surface 110s2 from the first surface 110s1. The first groove 110r may be extended back and forth between the first surface 110s1 and the second surface 110s2. In the present embodiment, the first groove 110r comprises a first straight groove 110r1 and a rotation groove 110r2. The first straight groove 110r1 extends to the first rotation groove 110r2 from the second surface 110s2 of the first barrel 110, and the first rotation groove 110r2 extends to the first surface 110s1 of the first barrel 110. In addition, the extension of the first groove 110r is not restricted by the exemplifications in the embodiments of the invention.

To elaborate the present embodiment in greater details, "straight groove" denotes the groove structure allowing the barrel to move in a straight line, and "rotation groove" denotes the groove structure allowing the barrel to rotate. For example, the first straight groove 110r1 only extends along the Z-axis, and is thus able to guide the barrel connected thereto to move in a straight line, wherein, the Z-axis is such as the central axis of the barrels. For example, the fourth sub-rotation groove 110r6 (FIG. 6B) only extends around the Z-axis and is thus able to guide the barrel connected thereto to rotate, wherein "extend around Z-axis" means "extend along the outer circumferential direction of a barrel". The first sub-rotation groove 110r3 (FIG. 6B) may extend along and around the Z-axis at the same time, and is thus able to guide the barrel connected thereto to rotate and move in a straight line, but the invention is not limited thereto.

As indicated in FIG. 6B, the first rotation groove 110r2 comprises a first sub-rotation groove 110r3, a second sub-rotation groove 110r4, a third sub-rotation groove 110r5 and a fourth sub-rotation groove 110r6. In the present embodiment, the third sub-rotation groove 110r5 connects the first sub-rotation groove 110r3 and the first straight groove 110r1, such that the first straight groove 110r1 is connected to the first sub-rotation groove 110r3 through the third sub-rotation groove 110r5. In another embodiment, the first rotation groove 110r2 may also omit the third sub-rotation groove 110r5, such that the first straight groove 110r1 directly extends to the first sub-rotation groove 110r3 from the second surface 110s2 of the first barrel 110. In the present embodiment, the fourth sub-rotation groove 110r6 connects the first sub-rotation groove 110r3 and the second sub-rotation groove 110r4, such that the first sub-rotation groove 110r3 is connected to the second sub-rotation groove 110r4 through the fourth sub-rotation groove 110r6. In another embodiment, the first rotation groove 110r2 may also omit the fourth sub-rotation groove 110r6, such that the first sub-rotation groove 110r3 is directly connected to the second sub-rotation groove 110r4.

As indicated in FIG. 6B, when the lens structure is at a close end, the second pin 120p of the second barrel 120 is positioned inside the first straight groove 110r1 or the first rotation groove 110r2 of the first barrel 110. In the present embodiment, the second pin 120p is exemplified as being positioned inside the third sub-rotation groove 110r5.

As indicated in FIG. 6B, the second sub-rotation groove 110r4 extends to the first surface 110s1 of the first barrel 110, wherein an acute angle A1 is contained between the first sub-rotation groove 110r3 and the second sub-rotation groove 110r4. To put it in greater details, the first sub-rotation groove 110r3 and the second sub-rotation groove 110r4 form a V-shaped groove. In another embodiment, the first sub-rotation groove 110r3 is substantially parallel to the second sub-rotation groove 110r4 and forms a U-shaped groove with the second sub-rotation groove 110r4.

As indicated in FIG. 6B, the first groove 110r has a first end 110e1 and a second end 110e2. The first end 110e1 and the first pin 110p are adjacent to the same lateral surface (such as the first surface 110s1) of the first barrel 110.

As indicated in FIG. 6B, the first end 110e1 and the second end 110e2 of the first groove 110r respectively extend to the first surface 110s1 and the second surface 110s2 of the first barrel 110, and form openings on the first surface 110s1 and the second surface 110s2. To put it in greater details, the first groove 110r is a guiding groove with two open ends. Since the two ends of the first groove 110r are open, the second pin 120p may enter the first groove 110r through the opening of the first groove 110r such that the second barrel 120 is conveniently disposed inside of the first barrel 110.

Figure 7A:
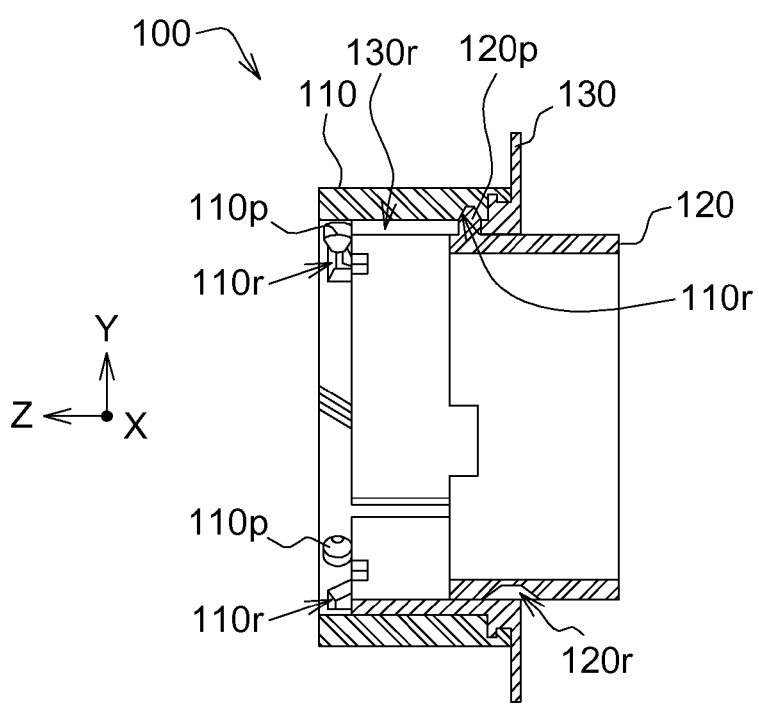
FIG. 7A shows a cross-sectional view of the lens structure of FIG. 6A being at a wide-angle end.
Figure 7B:
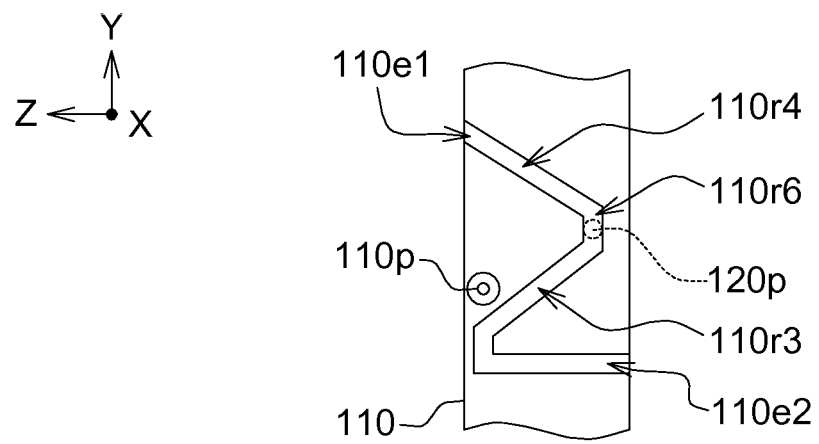
FIG. 7B shows a schematic diagram of a second pin of FIG. 7A positioned in a first groove of FIG. 3.

Referring to FIGS. 7A and 7B. FIG. 7A shows a cross-sectional view of the lens structure of FIG. 6A being at a wide-angle end. FIG. 7B shows a schematic diagram of a second pin of FIG. 7A positioned in a first groove of FIG. 3.

As indicated in FIG. 7A, during the process in which the first barrel 110 is rotated from the position as indicated in FIG. 6A to the position as indicated in FIG. 7A, the second pin 120p of the second barrel 120 slides along the third groove 130r of the third barrel 130 and the first groove 110r of the first barrel 110, and drives the second barrel 120 to move in a straight line towards the negative Z-axis. Meanwhile, the lens structure 100 of FIG. 7A is at a wide-angle end. During the process in which the second barrel 120 is shifted from a close end as indicated in FIG. 6A to a wide-angle end as indicated in FIG. 7A, the second pin 120p slides to the junction between the first sub-rotation groove 110r3 and the second sub-rotation groove 110r4 from the third sub-rotation groove 110r5 (FIG. 6B). The junction is such as the fourth sub-rotation groove 110r6 (FIG. 7B).

Figure 8A:
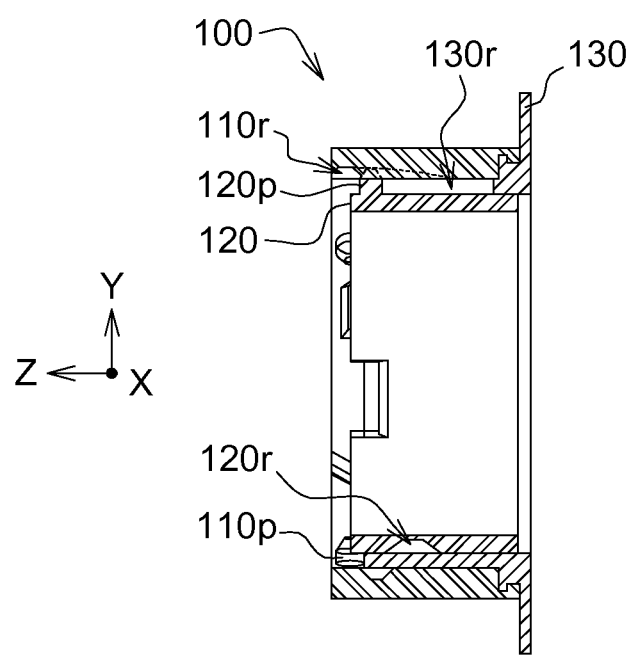
FIG. 8A shows a cross-sectional view of the lens structure of FIG. 7A changing to a telephoto end.
Figure 8B:
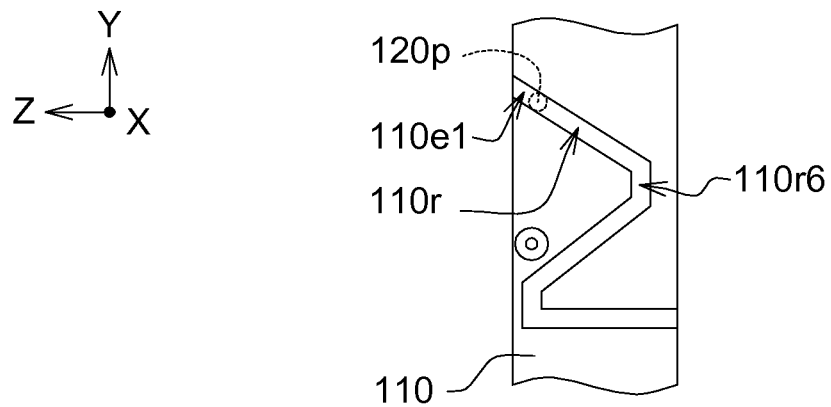
FIG. 8B shows a schematic diagram of a second pin of FIG. 8A positioned in a first groove of FIG. 3.
Figure 8C:
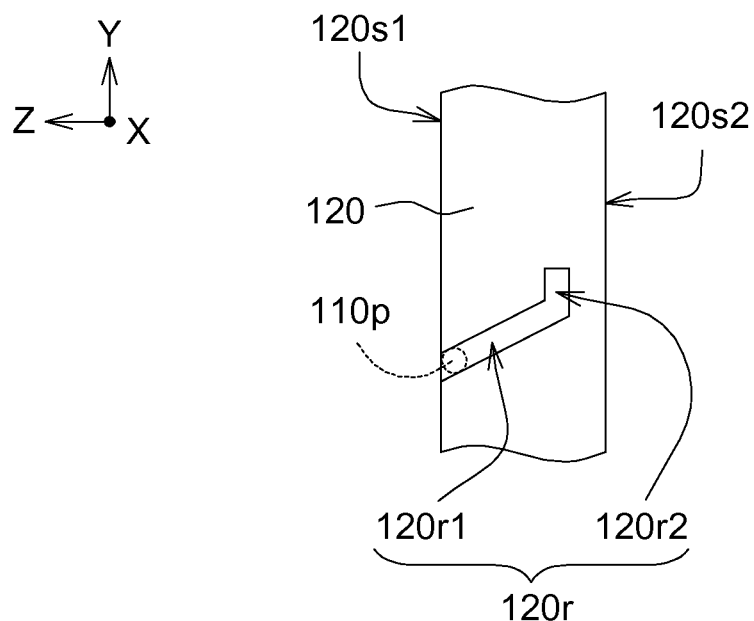
FIG. 8C shows a schematic diagram of a first pin of FIG. 2 positioned in a second groove of FIG. 4.

Referring to FIGS. 8A-8C. FIG. 8A shows a cross-sectional view of the lens structure of FIG. 7A changing to a telephoto end. FIG. 8B shows a schematic diagram of a second pin of FIG. 8A positioned in a first groove of FIG. 3. FIG. 8C shows a schematic diagram of a first pin of FIG. 2 positioned in a second groove of FIG. 4.

As indicated in FIG. 8A, during the process in which the first barrel 110 is rotated from the position as indicated in FIG. 7A to the position as indicated in FIG. 8A, the second pin 120p of the second barrel 120 slides along the third groove 130r of the third barrel 130 and the first groove 110r of the first barrel 110, and drives the second barrel 120 to move in a straight line towards the positive Z-axis until the position as indicated in FIG. 8A. During the process in which the second barrel 120 is shifted from the position as indicated in FIG. 7A to the position as indicated in FIG. 8A, the second pin 120p (FIG. 7B) slides to the first end 110e1 of the first groove 110r from the fourth sub-rotation groove 110r6 (FIG. 8B). When the second barrel 120 continues to rotate as indicated in FIG. 8C, the first pin 110p of the first barrel 110 starts to enter the second groove 120r of the second barrel 120. Meanwhile, the second pin 120p of FIG. 8A may be detached from the first groove 110r (for example, the second pin 120p slides to the outside of the first barrel 110). In another embodiment, the second pin 120p may remain being connected to the first groove 110r.

As indicated in FIG. 8C, the second barrel 120 has a first surface 120s1 and a second surface 120s2 opposite to each other, wherein the first surface 120s1 of the second barrel 120 and the first surface 110s1 of the first barrel 110 (FIG. 2) substantially face the same direction. The second groove 120r may extend to one of the first surface 120s1 and the second surface 120s2. In the present embodiment, the second groove 120r is exemplified as extending to the first surface 120s1. That is, one end of the second groove 120r has an opening on the first surface 120s1.

As indicated in FIG. 8C, the second groove 120r comprises a second rotation groove 120r1 and a fourth rotation groove 120r2, wherein the second rotation groove 120r1 is connected to the fourth rotation groove 120r2. The second rotation groove 120r1 extends to the fourth rotation groove 120r2 from the first surface 120s1 of the second barrel 120 in a direction towards the second surface 120s2. In another embodiment, the second groove 120r may also omit the fourth rotation groove 120r2. Besides, the extension of the second groove 120r is not restricted by the exemplifications in the embodiments of the invention.

Figure 9A:
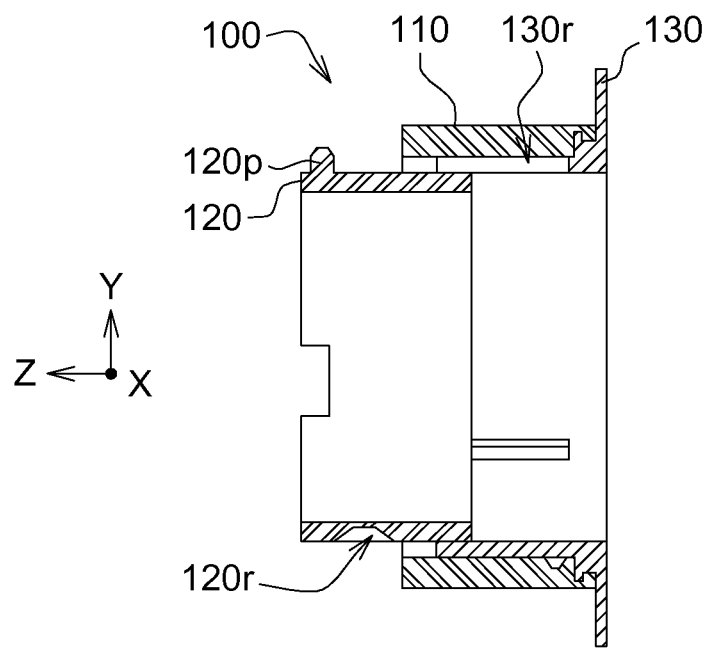
FIG. 9A shows a cross-sectional view of the lens structure of FIG. 8A changing to a telephoto end.
Figure 9B:
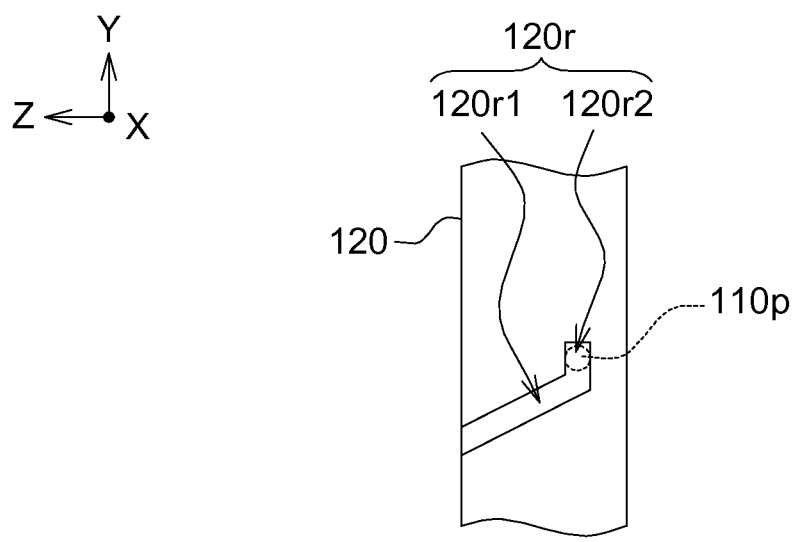
FIG. 9B shows a schematic diagram of a first pin of FIG. 9A positioned in a second groove of FIG. 4.

Referring to FIGS. 9A and 9B. FIG. 9A shows a cross-sectional view of the lens structure of FIG. 8A changing to a telephoto end. FIG. 9B shows a schematic diagram of a first pin of FIG. 9A positioned in a second groove of FIG. 4. Since the first pin 110p of FIG. 9A is blocked by the second barrel 120, the first pin 110p is not illustrated in FIG. 9A.

As indicated in FIG. 9A, during the process in which the first barrel 110 is rotated from the position as indicated in FIG. 7A to the position as indicated in FIG. 9A, the second pin 120p of the second barrel 120 is detached from the first groove 110r of the first barrel 110. Meanwhile, the first pin 110p of the first barrel 110 (FIG. 8C) enters the second groove 120r of the second barrel 120 and slides along the second groove 120r, such that the second barrel 120 continue to move forward along the Z-axis until the telephoto end as indicated in FIG. 9A.

As indicated in FIG. 9B, when the lens structure 100 is at a telephoto end, the first pin 110p is such as positioned inside the fourth rotation groove 120r2 of the second groove 120r.

Figure 10:
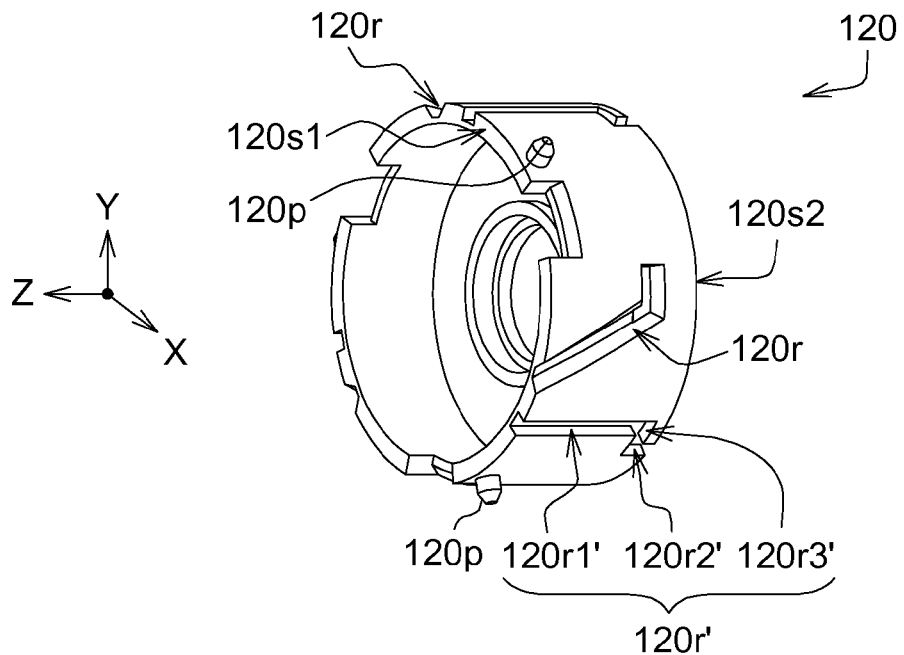
FIG. 10 shows a 3D view of the second barrel of FIG. 2.

Referring to FIG. 10, a 3D view of the second barrel of FIG. 2 is shown. The second barrel 120 further comprises at least one fourth groove 120r. The third barrel 130 further comprises at least one third pin 130p (FIG. 2). The number of the third pin 130p corresponds to that of the fourth groove 120r', and is such as three or any other numbers. In another embodiment, the third barrel 130 may also omit the fourth groove 120r' and the third pin 130p. Since the third pin 130p slides along the fourth groove 120r', the second barrel 120 does not rotate with respect to the third barrel 130, and details are disclosed below.

The fourth groove 120r extends to the second surface 120s2 from the first surface 120s1 of the second barrel 120, such that the two ends of the fourth groove 120r respectively have openings on the first surface 120s1 and the second surface 120s2.

As indicated in FIG. 10, the fourth groove 120r' comprises a third straight groove 120r1', a fourth straight groove 120r2' and a third rotation groove 120r3'. The third straight groove 120r1' extends to the third rotation groove 120r3' from the first surface 120s1 of the second barrel 120. The third rotation groove 120r3' extends to the fourth straight groove 120r2' along the outer circumferential direction of the second barrel 120. The fourth straight groove 120r2' extends to the second surface 120s2 of the second barrel 120.

Figure 11:
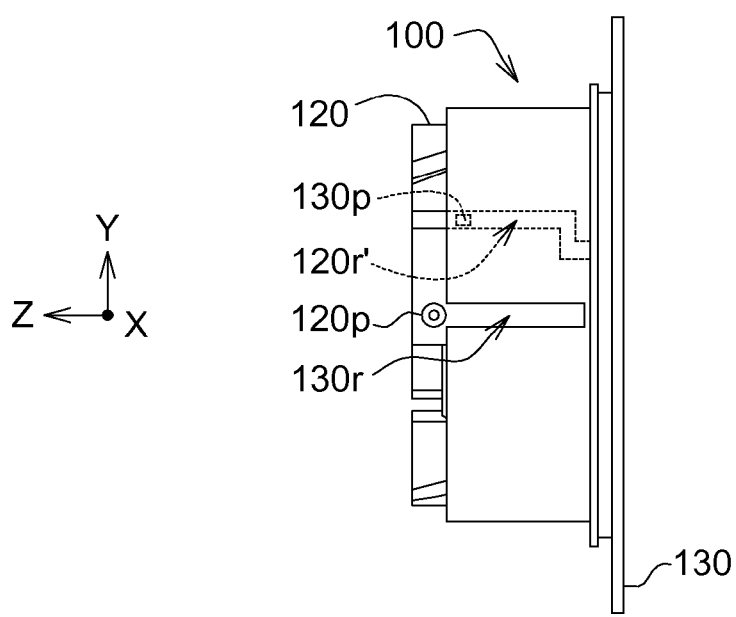
FIG. 11 shows a side view of a second barrel and a third barrel being at a close end according to the invention another embodiment.

Referring to FIG. 11, a side view of a second barrel 120 and a third barrel 130 being at a close end according to the invention another embodiment is shown. When the lens structure 100 is at a close end, the second pin 120p of the second barrel 120 is detached from the third groove 130r of the third barrel 130 but the third pin 130p still slides by the fourth groove 120r' (the third pin 130p is restricted by the fourth groove 120r'), making the second barrel 120 unable to rotate with respect to the third barrel 130.

Figure 12:
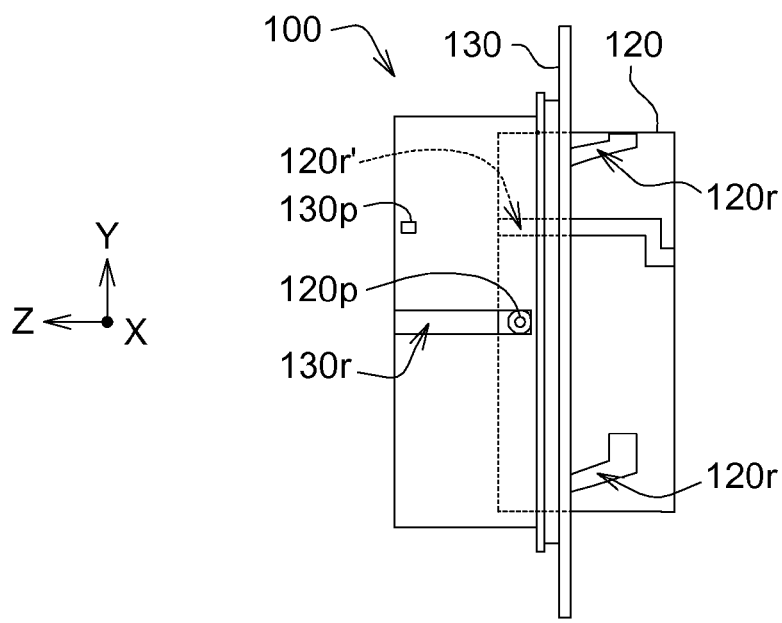
FIG. 12 shows a side view of the second barrel and the third barrel of FIG. 11 being at wide-angle end.

Referring to FIG. 12, a side view of the second barrel 120 and the third barrel 130 of FIG. 11 being at wide-angle end is shown. When the lens structure 100 is at a wide-angle end, the third pin 130p is detached from the fourth groove 120r' but the second pin 120p of the second barrel 120 still slides by the third groove 130r of the third barrel 130, making the second barrel 120 unable to rotate with respect to the third barrel 130.

Figure 13:
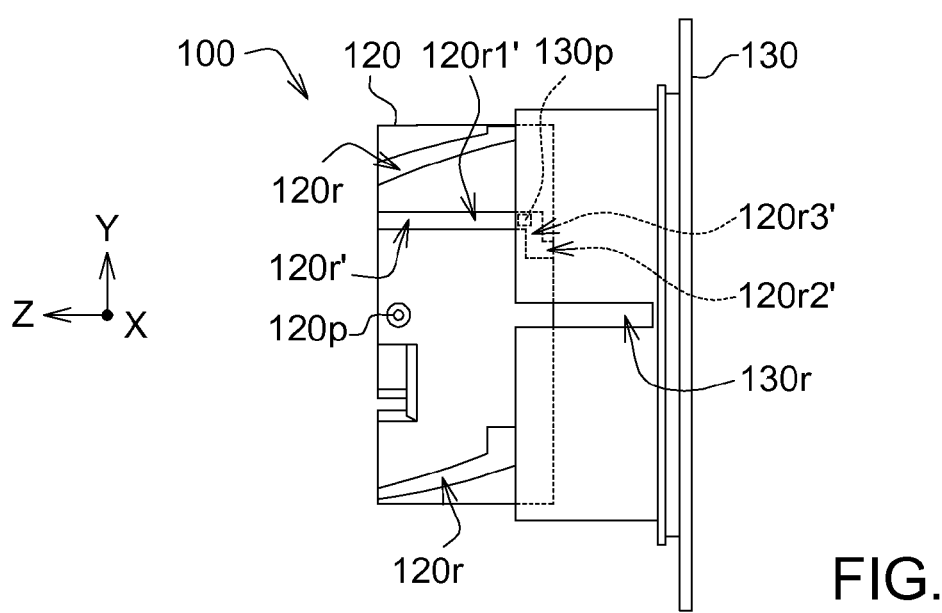
FIG. 13 shows a side view of the second barrel and the third barrel of FIG. 11 being at a telephoto end.

Referring to FIG. 13, a side view of the second barrel 120 and the third barrel 130 of FIG. 11 being at a telephoto end is shown. As indicated in FIG. 12, when the lens structure 100 is at a telephoto end, the second pin 120p of the second barrel 120 is detached from the third groove 130r of the third barrel 130 but the third pin 130p still slides by the fourth groove 120r', making the second barrel 120 unable to rotate with respect to the third barrel 130.

FIG. 13, when the lens structure 100 is at a telephoto end, the third pin 130p is position at the junction between the third straight groove 120r1' and the third rotation groove 120r3' of the fourth groove 120r. For example, the third pin 130p is position inside the third straight groove 120r1'. In the present embodiment, the third pin 130p may enter the third straight groove 120r1' via the fourth straight groove 120r2', such that the third barrel 130 is conveniently disposed on the second barrel 120.

To summarize, during the process in which the second barrel 120 moves with respect to the third barrel 130, it is either the second pin 120p of the second barrel 120 slides along the third groove 130r of the third barrel 130 or the third pin 130p of the third barrel 130 slides along the second groove 120r of the second barrel 120. In another embodiment, the second pin 120p of the second barrel 120 and the third pin 130p of the third barrel 130 respectively may slide along the third groove 130r of the third barrel 130 and the second groove 120r of the second barrel 120 at the same time.

According to the lens structure disclosed in the above embodiments of the invention, the continuous optical zooming path may be defined by the grooves of different barrels, such that the length of the continuous optical zooming path is increased. In addition, the continuous optical zooming path may be defined by the grooves of different barrels. Under the circumstance that the length of the optical zooming path remains the same or is increased, the thicknesses of the first barrel, the second barrel and the third barrel may be reduced such that both the volume and the weight of the lens structure are reduced accordingly.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A lens structure, comprising:
   a first barrel, comprising a first groove and a first pin;
   a second barrel, comprising a second groove and a second pin; and
   a third barrel, comprising a third groove;
   wherein the first barrel is disposed outside of the third barrel and the second barrel is disposed inside of the third barrel;
   wherein, in an optical zooming path, the second pin slides along the third groove and the first groove, and/or the first pin slides along the second groove; and
   wherein, in the optical zooming path, the first pin enters the second groove while the second pin detaches from the first groove, and the second pin enters the first groove while the first pin detaches from the second groove.

2. The lens structure according to claim 1, wherein the first groove and the second groove define the optical zooming path from a telephoto end to a wide-angle end.

3. The lens structure according to claim 1, wherein the first pin enters the second groove while the second pin detaches from the first groove, and the second pin enters the first groove while the first pin detaches from the second groove.

4. A lens structure, comprising:
   a first barrel, comprising a first groove, a first surface and a second surface opposite to the first surface, the first groove extending to the second surface from the first surface and forming openings on the first surface and the second surface; and
   a second barrel, comprising a second groove;
   wherein, the first groove and the second groove define a continuous optical zooming path between a telephoto end and a wide-angle end.

5. The lens structure according to claim 4, wherein the first barrel further comprises a first pin, the second barrel further comprises a second pin, the second pin slides in accordance with the first groove, and the first pin slides in accordance with the second groove.

6. The lens structure according to claim 5, wherein the first pin enters the second groove while the second pin detaches from the first groove, and the second pin enters the first groove while the first pin detaches from the second groove.

7. The lens structure according to claim 4, wherein the first groove comprises a first straight groove and a first rotation groove, the first straight groove extends to the first rotation groove from the second surface of the first barrel, and the first rotation groove extends to the first surface of the first barrel.

8. The lens structure according to claim 7, wherein the first rotation groove comprises a first sub-rotation groove and a second sub-rotation groove, the first straight groove extends to the first sub-rotation groove from the second surface of the first barrel, the first sub-rotation groove is connected to the second sub-rotation groove, and the second sub-rotation groove extends to the first surface of the first barrel.

9. The lens structure according to claim 8, wherein the first rotation groove further comprises an acute angle between the first sub-rotation groove and the second sub-rotation groove.

10. The lens structure according to claim 8, wherein the first rotation groove further comprises a third sub-rotation groove and a fourth sub-rotation groove, the third sub-rotation groove connects the first sub-rotation groove and the first straight groove, and the fourth sub-rotation groove connects the first sub-rotation groove and the second sub-rotation groove.

11. The lens structure according to claim 4, wherein the second barrel comprises a first surface and a second surface opposite to the first surface, and the second groove extends to one of the first and the second surfaces.

12. The lens structure according to claim 5, wherein the first groove comprises a first end, and the first end and the first pin are adjacent to the same lateral surface of the first barrel.

13. The lens structure according to claim 4, wherein the second groove comprises a second rotation groove and a fourth rotation groove, the second rotation groove is connected to the fourth rotation groove, and the second rotation groove extends to the fourth rotation groove from the first surface in a direction towards the second surface.

14. The lens structure according to claim 4, wherein the lens structure further comprises a third barrel, the second barrel further comprises a fourth groove, and a third pin of the third barrel slides in accordance with the fourth groove.

15. The lens structure according to claim 14, wherein the second barrel comprises a first surface and a second surface, the fourth groove extends to the second surface from the first surface, the fourth groove comprises a third straight groove, a fourth straight groove and a third rotation groove, the third straight groove extends to the third rotation groove from the first surface of the second barrel, the third rotation groove extends to the fourth straight groove along a circumferential direction of the second barrel, and the fourth straight groove extends to the second surface of the second barrel.

16. A lens structure, comprising an outer barrel and an inner barrel, the outer barrel comprising a first groove, a first pin, a first surface and a second surface opposite to the first surface, the first groove extending to the second surface from the first surface and forming openings on the first surface and the second surface, the inner barrel comprising a second groove and a second pin, and the outer barrel being rotatably disposed outside of the inner barrel, wherein:
the first groove and the second groove define an optical zooming path; and
in the optical zooming path, the second pin slides in accordance with the first groove, and/or the first pin slides in accordance with the second groove.

17. The lens structure according to claim 16, wherein the lens structure further comprises a third barrel disposed between the outer barrel and the inner barrel.

18. The lens structure according to claim 17, wherein the third barrel comprises a third groove, and the second pin slides along the third groove and the first groove.

19. An electronic apparatus comprising the lens structure claimed in claim 17.

* * * * *